US012596652B2

(12) United States Patent (10) Patent No.: US 12,596,652 B2
Halaharivi et al. (45) Date of Patent: Apr. 7, 2026

(54) MANAGING NAMESPACE MAPPING, TRUSTED COMPUTING GROUP RANGES, AND ENCRYPTIONS IN A MEMORY SUB-SYSTEM

(71) Applicant: Micron Technology, Inc., Boise, ID (US)

(72) Inventors: Raja V. S. Halaharivi, Gilroy, CA (US); Venkat R. Gaddam, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 41 days.

(21) Appl. No.: 18/526,499

(22) Filed: Dec. 1, 2023

(65) Prior Publication Data

US 2024/0184710 A1 Jun. 6, 2024

Related U.S. Application Data

(60) Provisional application No. 63/429,230, filed on Dec. 1, 2022.

(51) Int. Cl.
*G06F 12/10* (2016.01)
(52) U.S. Cl.
CPC ................................... *G06F 12/10* (2013.01)
(58) Field of Classification Search
CPC .... G06F 12/0246; G06F 3/0679; G06F 12/02; G06F 2212/7201; G06F 12/0292; G06F 12/10; G06F 2212/466; G06F 2212/2022; G06F 2212/7211; G06F 3/061; G06F 12/0646; G06F 3/0659

USPC ........... 711/103, 170, 202, 156, 12.002, 173, 711/12.008, 12.001, 221, 12.007, 12.014
See application file for complete search history.

(56) References Cited

U.S. PATENT DOCUMENTS

| | | | |
|---|---|---|---|
| 10,877,900 B1 * | 12/2020 | Muthiah ............. | G06F 12/1009 |
| 11,455,245 B2 * | 9/2022 | Duan ................... | G06F 12/1009 |
| 2012/0311228 A1 * | 12/2012 | Hsu ...................... | G06F 12/0246 |
| | | | 711/E12.007 |
| 2014/0129761 A1 * | 5/2014 | Kwon .................. | G06F 12/0246 |
| | | | 711/103 |
| 2014/0149640 A1 * | 5/2014 | Burke ................... | G06F 1/3225 |
| | | | 711/103 |
| 2017/0083436 A1 * | 3/2017 | Jung .................... | G06F 12/0246 |
| 2020/0218673 A1 * | 7/2020 | Parker ................. | G06F 12/1458 |
| 2020/0249957 A1 * | 8/2020 | Qin ....................... | G06F 9/4405 |
| 2022/0206706 A1 * | 6/2022 | Kim ..................... | G06F 11/1048 |

* cited by examiner

*Primary Examiner* — Jared I Rutz
*Assistant Examiner* — Edward Waddy, Jr.
(74) *Attorney, Agent, or Firm* — Lowenstein Sandler LLP

(57) ABSTRACT

A system includes a memory device and a processing device, operatively coupled with the memory device, to perform operations including: receiving a request to modify one or more regions of the memory device; identifying one or more mapping structures associated with each region of the one or more regions of the memory device; determining that a counter satisfies a threshold criterion, wherein the counter indicates a number of memory access commands at the one or more regions; creating a copy of each mapping structure associated with each region; and modifying the copy of each mapping structure according to the request to modify the one or more regions of the memory device.

20 Claims, 5 Drawing Sheets

200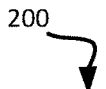

| Internal NSID | LBA Range | NS Granularity |
|---|---|---|
| 1 | LBA xxx-xxx' | 256GB |
| 2 | LBA yyy-yyy' | 256GB |
| 3 | LBA zzz-zzz' | 256GB |
| 4 | LBA aaa-aaa' | 256GB |

Mapping Structure
201

| LBA Range | Permissions | Range |
|---|---|---|
| LBA xxx-xxx' | R/W | Global |
| LBA yyy-yyy' | R/W | Local |
| LBA zzz-zzz' | W | Local |
| LBA aaa-aaa' | R | Global |

Mapping Structure
203

| LBA Range | Encryption Type |
|---|---|
| LBA xxx-xxx' | Encryption Type 222a |
| LBA yyy-yyy' | Encryption Type 222b |
| LBA zzz-zzz' | Encryption Type 222c |
| LBA aaa-aaa' | Encryption Type 222d |

Mapping Structure
205

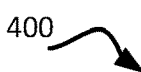

400

Receive, by a firmware component, a request to modify one or more regions of a memory device 410

Identify one or more mapping structures associated with each region of the one or more regions of the memory device 420

Determine that a counter satisfies a threshold criterion
425

Create a copy of each mapping structure associated with each region
430

Identify an instruction to modify the copy of each mapping structure
440

Update an entry of the copy of each mapping structure according to the instruction
450

Notify a hardware component of the modification of the copy of each mapping structure 460

Cause the hardware component to execute a memory access command using the copy of each mapping structure 470

Receive an acknowledgement to the firmware component that the hardware component is executing the memory access command using the copy of each mapping structure 480

FIG. 4

MANAGING NAMESPACE MAPPING, TRUSTED COMPUTING GROUP RANGES, AND ENCRYPTIONS IN A MEMORY SUB-SYSTEM

RELATED APPLICATIONS

This application claims the priority and benefit of U.S. Provisional Application No. 63/429,230, filed on Dec. 1, 2022, the entire content of which is incorporated by reference herein.

TECHNICAL FIELD

Embodiments of the disclosure relate generally to memory sub-systems, and more specifically, relate to managing namespace mapping, trusted computing group ranges, and encryptions in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates an example set of mapping structures associated with a namespace in a memory sub-system, in accordance with some embodiments of the present disclosure.

FIG. 4 is a flow diagram illustrating an example of a method to implement managing namespace mapping, trusted computing group ranges, and encryptions in a memory sub-system, in accordance with some embodiments of the present disclosure.

DETAILED DESCRIPTION

Figure 1:
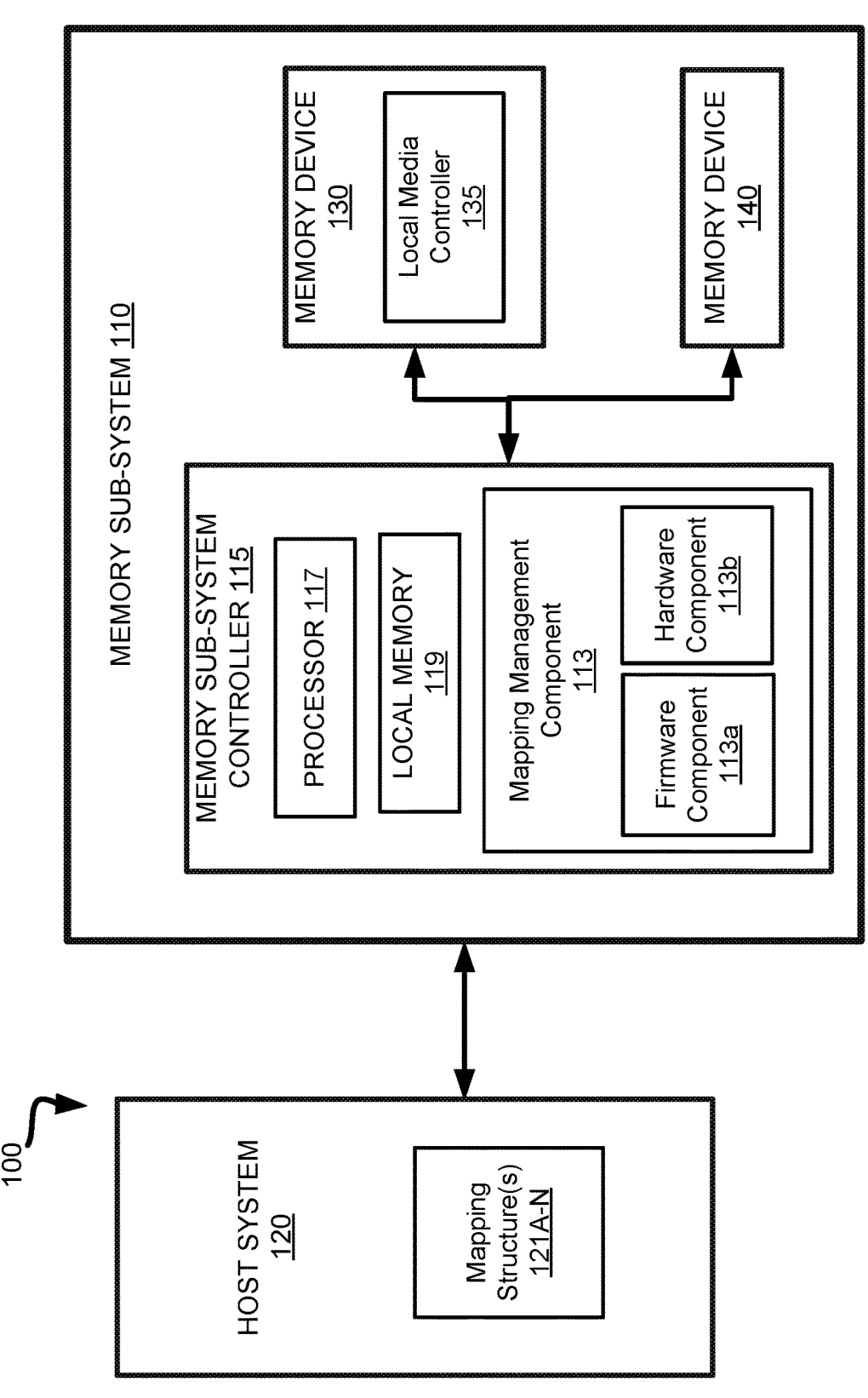
FIG. 1 illustrates an example computing system that includes a memory sub-system, in accordance with some embodiments of the present disclosure.

Aspects of the present disclosure are directed to managing namespace mapping, trusted computing group ranges, and encryptions in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a NAND memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

Memory access operations can be performed by the memory sub-system. The memory access operations can be host-initiated operations. For example, the host system can initiate a memory access operation (e.g., write, read, erase, etc.) on a memory sub-system. The host system can send memory access commands (e.g., write command, read command) to the memory sub-system, such as to store data in the memory device at the memory sub-system and to read data from the memory device of the memory sub-system.

The host system can use a logical address space to access the memory device. The logical address space can identify a logical unit, such as a logical block. For some types of memory devices, a logical block is the smallest write/read unit. For example, the size of data in a logical block can be 512 bytes, 4096 bytes (4 KB), etc., depending on the specification of the memory device. In certain memory devices, a logical block can be a group of logical pages. A logical page is an abstraction of physical pages. A memory sub-system can define a logical page to be equal to a particular unit of physical storage (e.g., a physical page, a physical block, etc.). A logical block address (LBA) is an identifier of a logical block. In an addressing scheme for logical blocks, logical blocks can be located using an integer index, with the first block being LBA 0, the second being LBA 1, and so on.

When the host system requests to access data (e.g., read data, write data), the host system can send a memory access command to the memory device directed to a logical address space. The logical address space can identify a logical unit, such as a logical block (e.g., the smallest write/read unit). In certain memory sub-systems, the host system can provide logical address information (e.g., logical block address (LBA), namespace) identifying the location where the data is to be stored at or read from. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), and the like. For simplicity, where "data" is referred to hereinafter, such data can be understood to refer to at least host data, but can also refer to other data such as system data.

In certain memory devices, the logical address space of the memory device is divided into namespaces that allow for more efficient management of data. Each namespace can be mapped to multiple logical blocks. For example, one or more LBAs can be mapped to a particular namespace. Each namespace can be referenced using a namespace identifier (NSID). Each namespace can include a namespace data structure (e.g., a table) that is created, updated, or deleted, e.g., using NameSpace Management and Namespace Attachment commands as defined by the NVM Express™ (NVMe™) Specification. The namespace data structure can indicate capabilities and settings that are specific to a particular namespace. Each namespace can also be associated with related data structures, such as trusted computing group (TCG) data structure (e.g., table) that identifies (e.g., using a secured processor) global and/or local security permissions associated with one or more ranges (e.g., LBAs) mapped to the namespace. For example, the TCG data structure can identify whether a particular range in a particular namespace is read-only, write-only, read and write, etc. Each namespace can also be associated with related data structures, such as a key index data structure that identifies a type of encryption (e.g., Advanced Encryption Standard (AES) encryption) to be used when performing a memory access operation on data mapped to a particular namespace. In some embodiments, the type of encryption used can be based on a namespace or on a key per I/O using, e.g., a secured processor.

In certain memory devices, when a namespace is being created, updated, or deleted, memory access commands that are being executed on data corresponding to the other existing namespaces are stopped (e.g., arbitration of memory access commands is paused globally) until the namespace is created, updated, or deleted. This can be inefficient and impact the performance of the memory sub-system since memory access commands cannot be executed while another namespace is being created, updated, or deleted.

Aspects of the present disclosure address the above and other deficiencies by managing namespace mapping, trusted computing group ranges, and encryptions in a memory sub-system. Implementing the managing of namespace mapping, trusted computing group ranges, and encryptions in a memory sub-system can be used to allow live traffic to continue being processed (e.g., continue executing memory access commands at a namespace data structure, a TCG data structure, and/or an encryption data structure) while processing another namespace data structure, TCG data structure, and/or encryption data structure that is being created, updated, and/or deleted at the same time. For example, instead of having to stop execution of memory access commands at the other namespaces in order to create, update, or delete another namespace, a firmware component of the memory sub-system can receive and process a request to create/update/delete a namespace. The firmware component can determine that a counter (e.g., a counter keeping track of a number of memory access commands at a namespace, physical and/or virtual function, and or interface port) satisfies a threshold criterion (e.g., the counter is equal to 0, such that the number of memory access commands is 0). The firmware component can then create a separate copy of the namespace data structure and its related data structures (e.g., the TCG data structure and the key index data structure). The firmware component can modify the separate copy of the namespace data structure and its related data structures with the newly created/updated/deleted namespace. Once the separate copy of the namespace data structure and its related data structures are created and/or modified, the firmware component can notify a hardware component of the memory sub-system to switch to executing the memory access commands using the separate copy of the namespace data structure and its related data structures. The hardware component can send an acknowledgement (e.g., notification) to the firmware component to notify the firmware component that the hardware component is executing the memory access commands using the separate copy of the namespace data structure and its related data structures. As such, the hardware component can continue executing memory access commands at namespaces without being impacted (e.g., having to pause arbitration of other memory access commands in the memory sub-system) when another namespace is being created/updated/deleted. Instead, the firmware component can create a separate copy of the namespace data structure and its related data structures in order to process (e.g., create/update/delete) the other namespace and then notify the hardware component to use the separate copy once it has been updated by the firmware component.

To implement managing namespace mapping, trusted computing group ranges, and encryptions in a memory sub-system as described herein, a memory sub-system controller can receive a request (e.g., from a host system) to modify one or more regions of a memory device. Each region can represent a namespace of the memory device. The request can include an instruction to create a new region, update a region, or remove a region. In some embodiments, a firmware component of the memory sub-system controller can receive the request. The firmware component can identify one or more mapping structures that are associated with each region (e.g., each namespace). The one or more mapping structures can be the mapping structures related to a namespace. For example, the one or more mapping structures can include the namespace data structure that includes a mapping of each LBA or a range of LBAs to a particular namespace ID, a TCG data structure that identifies (e.g., using a secured processor) a set of global and/or local permissions associated with each LBA or range of LBAs mapped to a particular namespace ID, and/or a key index data structure that identifies a type of encryption (e.g., Advanced Encryption Standard (AES) encryption) to use when executing a memory access command at each LBA or range of LBAs mapped to a particular namespace ID. The firmware component can determine that a counter (e.g., a counter keeping track of a number of memory access commands at a namespace, physical and/or virtual function, and or interface port) satisfies a threshold criterion (e.g., the counter is equal to 0, such that the number of memory access commands is 0). In some embodiments, in response to determining that the counter satisfies the threshold criterion, the firmware component can create a separate copy (e.g., a duplicate copy) of each mapping structure. In some embodiments, the firmware component can modify the separate copy according to the request received to modify the one or more regions. For example, the request can include an instruction to create a new region. In response, the firmware component can add or update an entry of each mapping structure to reference the new region. In another example, the request can include an instruction to update a region. In response, the firmware component can update an entry of each mapping structure to reference the update to the region. In another example, the request can include an instruction to remove (e.g., delete) a region. In response, the firmware component can remove an entry referring the removed region in each mapping structure. In some embodiments, the firmware component can notify a hardware component of the memory sub-system controller that the copy of each mapping structure for the one or more regions has been modified according to the request. In some embodiments, the hardware component, in response to receiving the notification, can switch to using the copy of each mapping structure. In some embodiments, the hardware component can execute a memory access command using the copy of each mapping structure rather than the initial (i.e., original) one or more mapping structures associated with the one or more regions. In some embodiments, the hardware component can send an acknowledgement (e.g., notification) to the firmware component to notify the firmware component that the hardware component is executing the memory access commands using the separate copy of the namespace data structure and its related data structures.

Further details regarding implementing managing namespace mapping, trusted computing group ranges, and encryptions in a memory sub-system are described herein below with reference to FIGS. 3-4.

Advantages of the present disclosure include, but are not limited to, improved memory device system performance and quality of service (QoS). Instead of having to stop execution of memory access commands at the memory device when a new namespace needs to be created, a namespace has to be updated, or a namespace had to be deleted, a firmware component of a memory sub-system controller can determine that a counter maintained to keep track of a number of memory access commands at a namespace, function, and/or interface port satisfies a threshold criterion (e.g., the counter is equal to 0). In response, the firmware component can create a separate copy of a namespace data structure and its related data structures. The firmware component can process a command (e.g., create/update/delete) to the namespace using the separate copy and then notify a hardware component of the memory subsystem controller to switch to the separate copy once it has been updated by the firmware component, thus allowing hardware component to continue executing memory access commands mapped to other namespaces of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. The host system 120 can include one or more mapping structures 121A to 121N. Each mapping structure 121A to 121N can be a data structure (e.g., a table) with one or more entries. The one or more mapping structures 121A to 121N can be coupled to and/or otherwise accessible to the host system 120. Further details with regard to the mapping structures 121A to 121N are described with reference to FIG. 2 herein.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a mapping management component 113 that can be used to implement managing namespace mapping, trusted computing groups, and encryptions in a memory sub-system, in accordance with embodiments of the present disclosure. The mapping management component 113 can include a firmware component 113a and a hardware component 113b. The hardware component 113b can be circuitry of the memory sub-system controller 115 that is used to transmit and receive data to and from the memory devices 130, 140 of the memory sub-system 110. The firmware component 113a can be the firmware of the memory sub-system controller 115 that provides some control to the hardware component 113b of the memory sub-system controller 115. Further details with respect to the firmware component 113a and the hardware component 113b are described with respect to FIGS. 3-4. In some embodiments, the memory sub-system controller 115 includes at least a portion of the mapping management component 113. In some embodiments, the mapping management component 113 is part of the host system 110, an application, or an operating system. In other embodiments, local media controller 135 includes at least a portion of mapping management component 113 and is configured to perform the functionality described herein.

In some embodiments, the mapping management component 113 can receive a request (e.g., from a host system) to modify one or more regions of a memory device. Each region can represent a namespace of the memory device. The request can include an instruction to create a new region, update a region, or remove a region. In some embodiments, the mapping management component 113 can receive the request. The mapping management component 113 can identify one or more mapping structures that are associated with each region (e.g., each namespace). The one or more mapping structures can be the mapping structures related to a namespace. For example, the one or more mapping structures can include the namespace data structure that includes a mapping of each LBA or a range of LBAs to a particular namespace ID, a TCG data structure that identifies (e.g., using a secured processor) a set of global and/or local permissions associated with each LBA or range of LBAs mapped to a particular namespace ID, and/or a key index data structure that identifies a type of encryption to use when executing a memory access command at each LBA or range of LBAs mapped to a particular namespace ID. In some embodiments, the mapping management component 113 can determine that a counter (e.g., a counter keeping track of a number of memory access commands at a namespace, physical and/or virtual function, and or interface port) satisfies a threshold criterion (e.g., the counter is equal to 0, such that the number of memory access commands is 0). In some embodiments, the mapping management component 113 can create a separate copy (e.g., a duplicate copy) of each mapping structure. In some embodiments, the mapping management component 113 can modify the separate copy according to the request received to modify the one or more regions. For example, the request can include an instruction to create a new region. In response, the mapping management component 113 can add or update an entry of each mapping structure to reference the new region. In another example, the request can include an instruction to update a region. In response, the mapping management component 113 can update an entry of each mapping structure to reference the update to the region. In another example, the request can include an instruction to remove (e.g., delete) a region. In response, the mapping management component 113 can remove an entry referring the removed region in each mapping structure. In some embodiments, the mapping management component 113 (e.g., a firmware component, such as the firmware component 113a as illustrated in FIG. 1) can notify a hardware component (e.g., the hardware component 113b illustrated in FIG. 1) that the copy of each mapping structure for the one or more regions has been modified according to the request. In some embodiments, the hardware component, in response to receiving the notification, can switch to using the copy of each mapping structure. In some embodiments, the hardware component can execute a memory access command using the copy of each mapping structure rather than the initial (i.e., original) one or more mapping structures associated with the one or more regions. In some embodiments, the mapping management component 113 can receive, from the hardware component, an acknowledgement (e.g., notification) to the firmware component to notify the firmware component that the hardware component is executing the memory access commands using the separate copy of the namespace data structure and its related data structures.

Further details regarding implementing managing namespace mapping, trusted computing group ranges, and encryptions in a memory sub-system are described herein below with reference to FIGS. 3-4.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

FIG. 2 illustrates an example set of mapping structures 200 associated with a namespace in a memory sub-system, in accordance with some embodiments of the present disclosure. As illustrated in FIG. 2, a namespace can have one or more mapping structures associated with it. For example, there can be a mapping structure 201, a mapping structure 203, and a mapping structure 205. In some embodiments, the mapping structures 201, 203, and/or 205 can be one or more of the mapping structures 121A to 121N as illustrated in FIG. 1. The mapping structures 201, 203, and/or 205 can be maintained by a host device (e.g., the host system 120 of FIG. 1). In some embodiments, there can be one or more additional mapping structures associated with a namespace, which are not illustrated in FIG. 2.

In some embodiments, the mapping structure 201 can be referred to as a namespace data structure. The mapping structure 201 can include one or more entries, including an internal namespace identifier (NSID), an LBA range, and a namespace (NS) granularity. The NSID can identify a namespace to which a specific range of LBAs is mapped. For example, the mapping structure 201 can include NSID 1, NSID 2, NSID 3, and NSID 4. NSID 1 can include an LBA range from xxx to xxx'. NSID 2 can include an LBA range from yyy to yyy'. NSID 3 can include an LBA range from zzz to zzz'. NSID 4 can include an LBA range from aaa to aaa'. Each consecutive NSID can have a sequential range of LBAs. In some embodiments, there can be 512 namespaces (e.g., 512 NSIDs). In some embodiments, the number of namespaces can be preconfigured at manufacturing based on offline testing and media characterization of the memory device. In some embodiments, the namespaces can be mapped to up to 2048 LBA ranges. In some embodiments, the number of LBA ranges that can be mapped to namespaces can be preconfigured at manufacturing based on offline testing and media characterization of the memory device. In some embodiments, the mapping structure 201 can identify a size of each LBA range. For example, the mapping structure 201 can identify that NSID 1 has an LBA range with a size of 256 GB; NSID 2 has an LBA range with a size of 256 GB; NSID 3 has an LBA range with a size of 256 GB; and NSID 4 has an LBA range with a size of 246 GB. In some embodiments, each NSID can have an LBA range with a differing size than another NSID. In some embodiments, each NSID can have an LBA range with the same size as another NSID or each NSID. In some embodiments, the size of each LBA range can be up to the drive capacity of the memory device. In some embodiments, the size of each LBA range is defined by a host system of the memory sub-system. In some embodiments, the size of each LBA range is preconfigured at manufacturing based on offline testing and media characterization of the memory device.

In some embodiments, the mapping structure 203 can be referred to as a TCG data structure. The mapping structure 203 can include one or more entries. Each entry can identify a set of global and/or local permissions that are associated with each LBA range (and thus each NSID). The set of global and/or local permissions can include read-only, write-only, or read and write permissions for executing memory access commands using data residing within an LBA range. For example, the mapping structure 203 can include an LBA xxx-xxx' range associated with an R/W (e.g., read and write) permission. The mapping structure 203 can include an LBA yyy-yyy' range associated with an R/W permission. The mapping structure 203 can include an LBA zzz-zzz' range associated with a W (e.g., write only) permission. The mapping structure 203 can include an LBA aaa-aaa' range associated with an R (e.g., read only) permission.

In some embodiments, the mapping structure 205 can be referred to as a key index data structure. The mapping structure 205 can include one or more entries. Each entry can identify an encryption type (e.g., Advanced Encryption Standard (AES) encryption) to use when executing a memory access command at a particular LBA range. For example, the LBA xxx-xxx' range can be associated with an encryption type 222a. The LBA yyy-yyy' range can be associated with an encryption type 222b. The LBA zzz-zzz' range can be associated with an encryption type 222c. The LBA aaa-aaa' range can be associated with an encryption type 222d. In some embodiments, the type of encryption used can be based on a namespace or on a key per I/O using, e.g., a secured processor.

Figure 3:
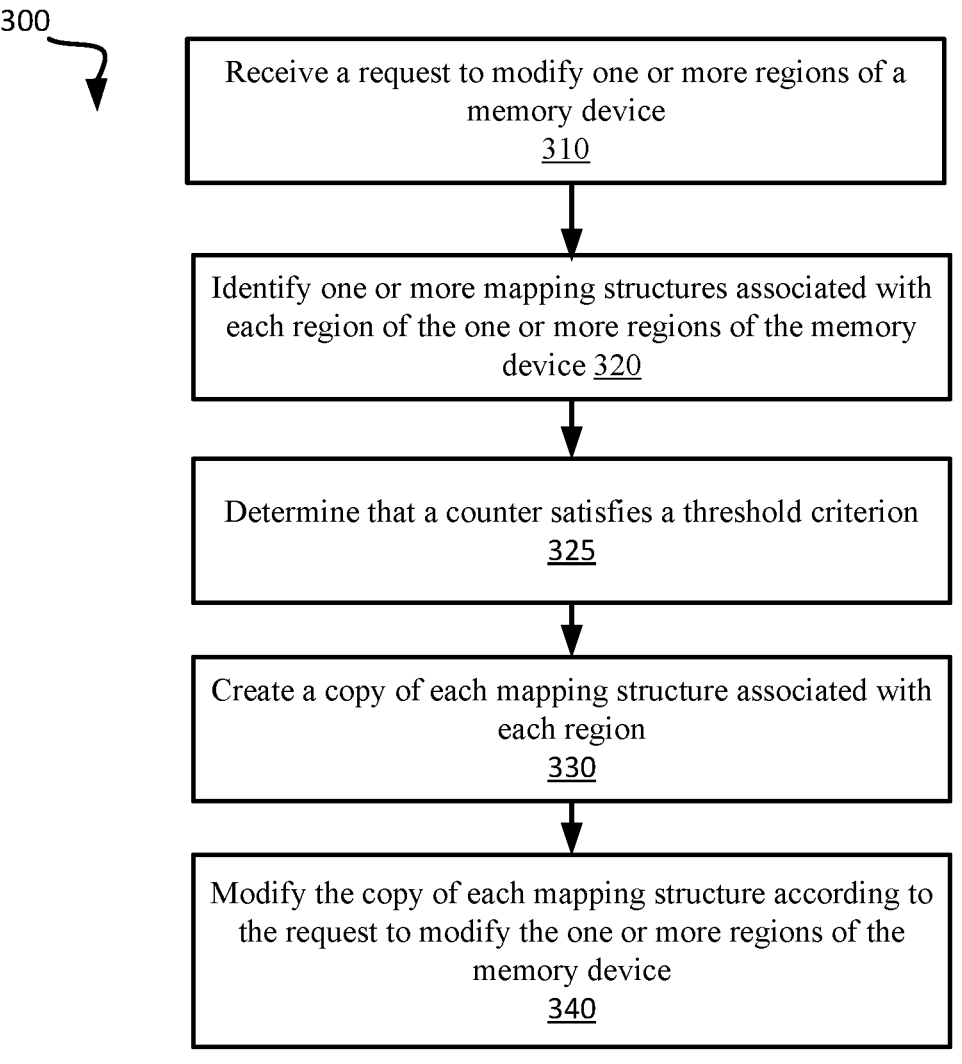
FIG. 3 is a flow diagram illustrating an example of a method to implement managing namespace mapping, trusted computing group ranges, and encryptions in a memory sub-system, in accordance with some embodiments of the present disclosure.

FIG. 3 is a flow diagram of an example method 300 to implement managing namespace mapping, trusted computing group ranges, and encryptions in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the mapping management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a request to modify one or more regions of a memory region, such as a memory device 130 of FIG. 1. In some embodiments, the processing logic can receive the request at a memory sub-system controller (e.g., the memory sub-system controller 115 of FIG. 1) from a host device (e.g., the host system 120 of FIG. 1). In some embodiments, processing logic can receive the request via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled to the host device by the PCIe interface. The interface port can provide an interface for passing control, address, data, and other signals between the memory sub-system and the host device. The memory sub-system can include multiple interface ports. In some embodiments, the processing logic can receive the request by accessing one or more registers associated with the host device, wherein the one or more registers stores the request sent by the host device. In some embodiments, the one or more regions of the memory device can each be a namespace of the memory device, as described herein. In some embodiments, the one or more regions of the memory device can each be a logical grouping of LBAs, such as a queue. In some embodiments, the one or more regions of the memory device can be one or more physical functions, where each physical function has a corresponding set of quality of service (QoS) parameters (e.g., bandwidth of the memory device, latency of the memory device, etc.) In some embodiments, the request to modify the one or more regions can include one or more instructions. In some embodiments, the one or more instructions can be to add (e.g., create) a new region and add the new region to the one or more regions. In some embodiments, the one or more instructions can be to update an existing region of the one or more regions. In some embodiments, the one or more instructions can be to remove (e.g., delete) an existing region of the one or more regions. In some embodiments, a firmware component of the memory device (e.g., the firmware component 113a of FIG. 1) receives the request to modify the one or more regions of the memory device.

At operation 320, the processing logic identifies one or more mapping structures associated with each region of the one or more regions of the memory device. In some embodiments, the one or more mapping structures can include the mapping structures 201, 203, 205 illustrated in FIG. 2. In some embodiments, the one or more mapping structures can include a namespace data structure that includes one or more entries mapping an LBA range to a particular namespace identifier (NSID). The one or more entries can also specify a size of the LBA range. In some embodiments, the one or more mapping structures can include a TCG data structure that includes one or more entries mapping an LBA range to a set of global and/or local permissions. In some embodiments, the one or more mapping structures can include a key index data structure that includes one or more entries mapping an LBA range to a type of encryption method to use when executing a memory access command within the LBA range. In some embodiments, the one or more mapping structures can be stored on the memory device, e.g., the memory device 130 of FIG. 1.

At operation 325, the processing logic determines that a counter (e.g., a counter keeping track of a number of memory access commands at a namespace, physical and/or virtual function, and/or interface port) satisfies a threshold criterion. In some embodiments, satisfying the threshold criterion can include determining that the counter is equal to 0. In some embodiments, the processing logic determines that the counter satisfies the threshold criterion in response to stopping/pausing arbitration of memory access commands at a namespace, physical and/or virtual function, and/or interface port of the memory device. In some embodiments, the arbitration of memory access commands is paused until the counter satisfies the threshold criterion.

At operation 330, the processing logic creates a copy of each mapping structure associated with each region of the one or more regions of the memory device. In some embodiments, the processing logic can create the copy in response to determining that the counter satisfies the threshold criterion. In some embodiments, creating the copy of each mapping structure includes creating a duplicate of each entry of each mapping structure. In response to creating the duplicate of each entry of each mapping structure, the processing logic can store the copy of each mapping structure on the memory device, e.g., the memory device 130 of FIG. 1.

At operation 340, the processing logic modifies the copy of the one or more mapping structures created at operation 330. In some embodiments, modifying the copy of the one or more mapping structures can include identifying one or more instructions specified by the request. Identifying the instruction specified by the request can include reading the request (e.g., reading the data of the request) to identify the one or more instructions. In some embodiments, the one or more instructions can be to add (e.g., create) a new region and add the new region to the one or more regions. In some embodiments, the one or more instructions can be to update an existing region of the one or more regions. In some embodiments, the one or more instructions can be to remove (e.g., delete) an existing region of the one or more regions. In some embodiments, in response to identifying the instruction specified by the request, the processing logic can update one or more entries of each mapping structure in accordance with the one or more instructions. For example, the one or more instructions can be to create a new region. In response, the processing logic can add or update one or more entries of each mapping structure to include data that references the new region. For example, using FIG. 2 as an example, the processing logic can add one or more entries to the mapping structure 201. An entry can be added with a new NSID (e.g., NSID 5), an entry can be added with a new LBA range (e.g., LBA 41-50), and a size of the LBA range (e.g., 256 GB) can be added to another entry. In some embodiments, the one or more instructions can include data specifying the new LBA range and/or the size of the LBA range. In some embodiments, the new LBA range is a sequential range of LBAs of the size specified by the one or more instructions. The processing logic can also update, e.g., one or more entries of the mapping structure 203. For example, an entry can be added with the new LBA range as described with respect to the mapping structure 201. In some embodiments, an entry can be added with a set of permissions for the new LBA range. In some embodiments, the one or more instructions can be include data specifying the set of permissions for the new LBA range. In another example, the request can include an instruction to update a region. In response, the processing logic can update one or more entries of each mapping structure to include data referencing the update to the region. For example, using FIG. 2 as an example, the processing logic can update one or more entries to the mapping structure 201. For example, the size entry for NSID 4 can be updated with a new size. In some embodiments, the one or more instructions can include data specifying which entries to update and the updates (e.g., the data to update the entries with). In another example, the request can include an instruction to remove (e.g., delete) a region. In response, the processing logic can remove one or more entries of each mapping structure that reference a particular region. For example, using FIG. 2 as an example, the processing logic can remove one or more entries of the mapping structure 201. For example, the entries for NSID 3 can be removed (e.g., the NSID 3 entry, the LBA range entry referencing LBA 21 to LBA 30, and the size entry of 256 GB). The processing logic can also remove, e.g., one or more entries of the mapping structure 205. For example, an entry can be removed for the LBA range corresponding to NSID 3. Thus, the entry for LBA 21 to LBA 30 can be removed from the mapping structure 205. In some embodiments, the encryption type entry corresponding to the entry for LBA 21 to LBA 30 can also be removed. In some embodiments, removing an entry can include removing and/or updating one or more pointers to the entry.

FIG. 4 is a flow diagram illustrating an example of a method 400 to implement managing namespace mapping, trusted computing group ranges, and encryptions in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the mapping management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a request to modify one or more regions of a memory region, such as a memory device 130 of FIG. 1. In some embodiments, the processing logic can receive the request at a memory sub-system controller (e.g., the memory sub-system controller 115 of FIG. 1) from a host device (e.g., the host system 120 of FIG. 1). In some embodiments, processing logic can receive the request via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled with the host device by the PCIe interface. The interface port can provide an interface for passing control, address, data, and other signals between the memory sub-system and the host device. The memory sub-system can include multiple interface ports. In some embodiments, the processing logic can receive the request by accessing one or more registers associated with the host device, wherein the one or more registers stores the request sent by the host device. In some embodiments, the one or more regions of the memory device can each be a namespace of the memory device, as described herein. In some embodiments, the one or more regions of the memory device can each be a logical grouping of LBAs, such as a queue. In some embodiments, the one or more regions of the memory device can be one or more physical functions, where each physical function has a corresponding set of quality of service (QoS) parameters (e.g., bandwidth of the memory device, latency of the memory device, etc.) In some embodiments, the request to modify the one or more regions can include one or more instructions. In some embodiments, the one or more instructions can be to add (e.g., create) a new region and add the new region to the one or more regions. In some embodiments, the one or more instructions can be to update an existing region of the one or more regions. In some embodiments, the one or more instructions can be to remove (e.g., delete) an existing region of the one or more regions. In some embodiments, a firmware component of the memory device (e.g., the firmware component 113*a* of FIG. 1) receives the request to modify the one or more regions of the memory region.

At operation 420, the processing logic identifies one or more mapping structures associated with each region of the one or more regions of the memory device. In some embodiments, the one or more mapping structures can include the mapping structures 201, 203, 205 illustrated in FIG. 2. In some embodiments, the one or more mapping structures can include a namespace data structure that includes one or more entries mapping an LBA range to a particular namespace identifier (NSID). The one or more entries can also specify a size of the LBA range. In some embodiments, the one or more mapping structures can include a TCG data structure that includes one or more entries mapping an LBA range to a set of global and/or local permissions. In some embodiments, the one or more mapping structures can include a key index data structure that includes one or more entries mapping an LBA range to a type of encryption method to use when executing a memory access command within the LBA range. In some embodiments, the one or more mapping structures can be stored on the memory device, e.g., the memory device 130 of FIG. 1.

At operation 425, the processing logic determines that a counter (e.g., a counter keeping track of a number of memory access commands at a namespace, physical and/or virtual function, and or interface port) satisfies a threshold criterion. In some embodiments, satisfying the threshold criterion can include determining that the counter is equal to 0. In some embodiments, the processing logic determines that the counter satisfies the threshold criterion in response to stopping/pausing arbitration of memory access commands at a namespace, physical and/or virtual function, and/or interface port of the memory device. In some embodiments, the arbitration of memory access commands is paused until the counter satisfies the threshold criterion.

At operation 430, the processing logic creates a copy of each mapping structure associated with each region of the one or more regions of the memory device. In some embodiments, the processing logic creates the copy in response to determining that the counter satisfies the threshold criterion. In some embodiments, creating the copy of each mapping structure includes creating a duplicate of each entry of each mapping structure. In response to creating the duplicate of each entry of each mapping structure, the processing logic can store the copy of each mapping structure on the memory device, e.g., the memory device 130 of FIG. 1.

At operation 440, the processing logic identifies an instruction to modify the copy of each mapping structure associated with each region of the one or more regions of the memory device. In some embodiments, identifying the instruction specified by the request can include reading the request (e.g., reading the data of the request) to identify the one or more instructions. In some embodiments, the one or more instructions can be to add (e.g., create) a new region and add the new region to the one or more regions. In some embodiments, the one or more instructions can be to update an existing region of the one or more regions. In some embodiments, the one or more instructions can be to remove (e.g., delete) an existing region of the one or more regions.

At operation 450, the processing logic updates one or more entries of the copy of each mapping structure. In some embodiments, the processing logic updates the one or more entries in response to identifying the instruction at operation 440. For example, the one or more instructions can be to create a new region. In response, the processing logic can add or update one or more entries of each mapping structure to include data that references the new region. For example, using FIG. 2 as an example, the processing logic can add one or more entries to the mapping structure 201. An entry can be added with a new NSID (e.g., NSID 5), an entry can be added with a new LBA range (e.g., LBA 41-50), and a size of the LBA range (e.g., 256 GB) can be added to another entry. In some embodiments, the one or more instructions can include data specifying the new LBA range and/or the size of the LBA range. In some embodiments, the new LBA range is a sequential range of LBAs of the size specified by the one or more instructions. The processing logic can also update, e.g., one or more entries of the mapping structure 203. For example, an entry can be added with the new LBA range as described with respect to the mapping structure 201. In some embodiments, an entry can be added with a set of permissions for the new LBA range. In some embodiments, the one or more instructions can be include data specifying the set of permissions for the new LBA range. In another example, the request can include an instruction to update a region. In response, the processing logic can update one or more entries of each mapping structure to include data referencing the update to the region. For example, using FIG. 2 as an example, the processing logic can update one or more entries to the mapping structure 201. For example, the size entry for NSID 4 can be updated with a new size. In some embodiments, the one or more instructions can include data specifying which entries to update and the updates (e.g., the data to update the entries with). In another example, the request can include an instruction to remove (e.g., delete) a region. In response, the processing logic can remove one or more entries of each mapping structure that reference a particular region. For example, using FIG. 2 as an example, the processing logic can remove one or more entries of the mapping structure 201. For example, the entries for NSID 3 can be removed (e.g., the NSID 3 entry, the LBA range entry referencing LBA 21 to LBA 30, and the size entry of 256 GB). The processing logic can also remove, e.g., one or more entries of the mapping structure 205. For example, an entry can be removed for the LBA range corresponding to NSID 3. Thus, the entry for LBA 21 to LBA 30 can be removed from the mapping structure 205. In some embodiments, the encryption type entry corresponding to the entry for LBA 21 to LBA 30 can also be removed. In some embodiments, removing an entry can include removing and/or updating one or more pointers to the entry.

At operation 460, the processing logic notifies a hardware component of the memory device (e.g., the hardware component 113*b* of FIG. 1) of the modification of the copy of each mapping structure at operation 450. In some embodiments, notifying the hardware component can include sending an interrupt message to the hardware component. The processing logic can send the interrupt message to the hardware component. In some embodiments, the interrupt message can include data referencing the copy of each mapping structure as modified (e.g., updated) at operation 450. In some embodiments, the interrupt message is an electrical signal that interrupts the hardware component. In some embodiments, the interrupt message can be sent using an interrupt routine.

At operation 470, the processing logic causes the hardware component to execute a memory access command (e.g., a read command and/or write command) using the copy of each mapping structure. In some embodiments, the hardware component, in response to being notified at operation 460, can switch to using the copy of each mapping structure when executing memory access commands. In some embodiments, the hardware component can execute a memory access command using the copy of each mapping structure rather than the initial (i.e., original) one or more mapping structures associated with the one or more regions (e.g., the one or more mapping structures identified at operation 440).

At operation 480, the processing logic receives an acknowledgement (e.g., notification) to the firmware component to notify the firmware component that the hardware component is executing the memory access commands using the separate copy of the namespace data structure and its related data structures. In some embodiments, notifying the firmware component can include sending an interrupt message to the firmware component. In some embodiments, the interrupt message is an electrical signal that interrupts the firmware component. In some embodiments, the interrupt message can be sent using an interrupt routine.

Figure 5:
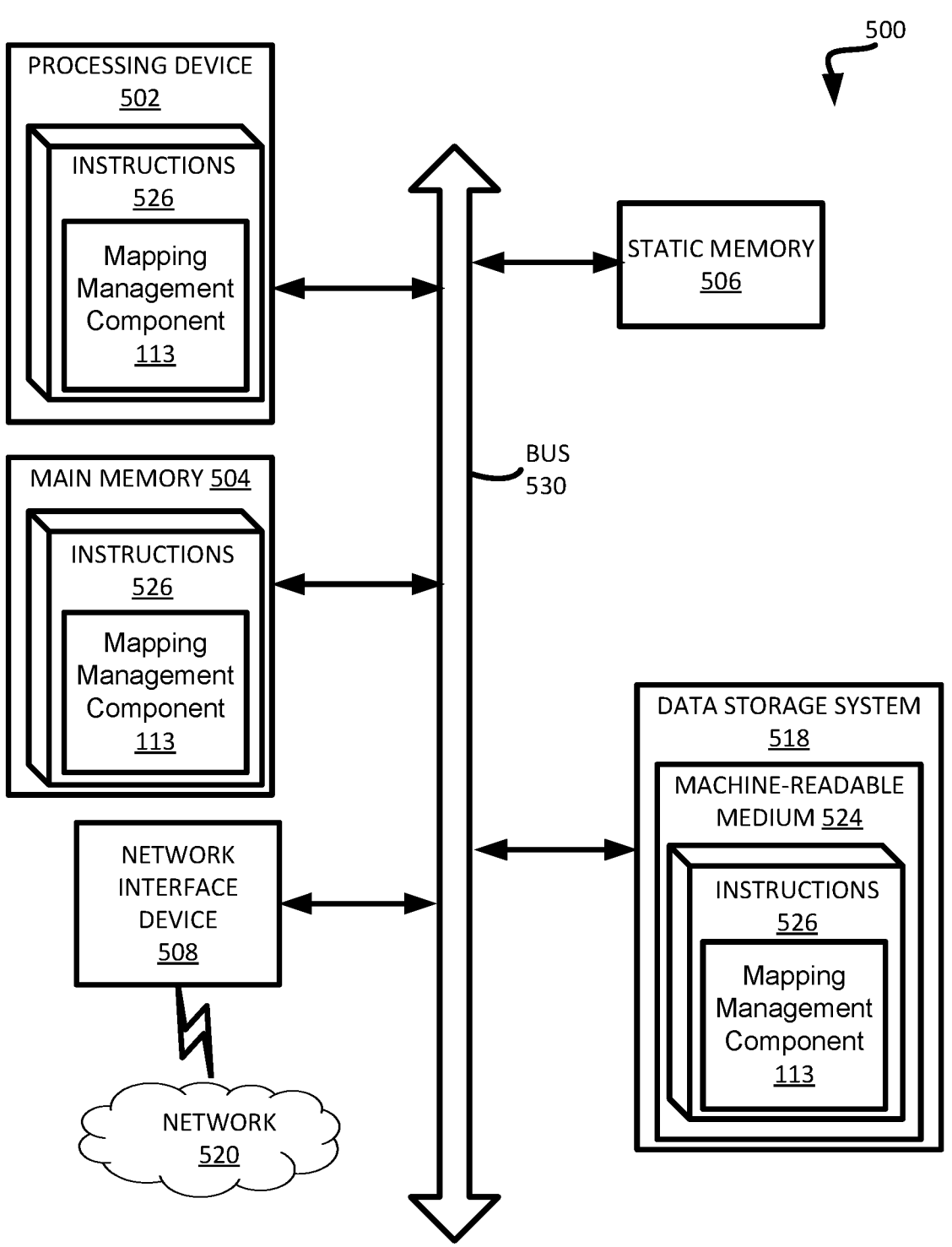
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the adaptive parameter component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a component (e.g., mapping management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
    receiving a request to modify one or more regions of the memory device;
    identifying one or more mapping structures associated with each region of the one or more regions of the memory device;
    determining that a counter satisfies a threshold criterion, wherein the counter indicates a number of memory access commands at the one or more regions;
    in response to determining that the counter satisfies the threshold criterion, creating a copy of each mapping structure associated with each region, wherein the copy of each mapping structure is stored locally on the memory device; and
    modifying the copy of each mapping structure according to the request to modify the one or more regions of the memory device.

2. The system of claim 1, wherein the processing device comprises a firmware component and a hardware component, and wherein the firmware component performs the receiving, the identifying, the creating, and the modifying.

3. The system of claim 2, further comprising:
notifying the hardware component of the processing device of the modification of the copy of each mapping structure.

4. The system of claim 2, further comprising:
causing the hardware component of the processing device to execute a memory access command using the copy of each mapping structure; and
receiving, from the hardware component, an acknowledgement of executing the memory access command using the copy of each mapping structure.

5. The system of claim 1, wherein the request to modify the one or more regions of the memory device comprises an instruction to add a region to the one or more regions.

6. The system of claim 1, wherein the request to modify the one or more regions of the memory device comprises an instruction to at least one of update or remove a region of the one or more regions.

7. The system of claim 1, wherein to modify the copy of each mapping structure according to the request to modify the one or more regions of the memory device, the processing device is to perform operations further comprising:
identifying an instruction to modify the copy of each mapping structure, wherein the instruction is specified by the request to modify the one or more regions of the memory device; and
updating an entry of the copy of each mapping structure according to the instruction.

8. A method comprising:
receiving, by a firmware component of a processing device, a request to modify one or more regions of a memory device, wherein the processing device comprises the firmware component and a hardware component;
identifying, by the firmware component, one or more mapping structures associated with each region of the one or more regions of the memory device;
determining that a counter satisfies a threshold criterion, wherein the counter indicates a number of memory access commands at the one or more regions;
in response to determining that the counter satisfies the threshold criterion, creating, by the firmware component, a copy of each mapping structure associated with each region, wherein the copy of each mapping structure is stored locally on the memory device;
modifying, by the firmware component, the copy of each mapping structure according to the request to modify the one or more regions of the memory device; and
notifying the hardware component of the modification of the copy of each mapping structure.

9. The method of claim 8, further comprising:
responsive to notifying the hardware component of the modification, causing the hardware component to execute a memory access command using the copy of each mapping structure; and
receiving, from the hardware component, an acknowledgement of executing the memory access command using the copy of each mapping structure.

10. The method of claim 8, wherein the request to modify the one or more regions of the memory device comprises an instruction to add a region to the one or more regions.

11. The method of claim 8, wherein the request to modify the one or more regions of the memory device comprises an instruction to update a region of the one or more regions.

12. The method of claim 8, wherein the request to modify the one or more regions of the memory device comprises an instruction to remove a region of the one or more regions.

13. The method of claim 8, wherein modifying the copy of each mapping structure according to the request to modify the one or more regions of the memory device further comprises:

identifying an instruction to modify the copy of each mapping structure, wherein the instruction is specified by the request to modify the one or more regions of the memory device; and updating an entry of the copy of each mapping structure according to the instruction.

14. A non-transitory computer-readable storage medium comprising instructions that, when executed by a processing device, cause the processing device to perform operations comprising:

receiving a request to modify one or more regions of a memory device;

identifying one or more mapping structures associated with each region of the one or more regions of the memory device;

determining that a counter satisfies a threshold criterion, wherein the counter indicates a number of memory access commands at the one or more regions;

in response to determining that the counter satisfies the threshold criterion, creating a copy of each mapping structure associated with each region, wherein the copy of each mapping structure is stored locally on the memory device; and modifying the copy of each mapping structure according to the request to modify the one or more regions of the memory device.

15. The non-transitory computer-readable storage medium of claim 14, wherein the processing device comprises a firmware component and a hardware component, and wherein the firmware component performs the receiving, the identifying, the creating, and the modifying.

16. The non-transitory computer-readable storage medium of claim 15, wherein the processing device is to perform operations further comprising:

notifying the hardware component of the modification of the copy of each mapping structure.

17. The non-transitory computer-readable storage medium of claim 15, wherein the processing device is to perform operations further comprising:

causing the hardware component to execute a memory access command using the copy of each mapping structure; and receiving, from the hardware component, an acknowledgement of executing the memory access command using the copy of each mapping structure.

18. The non-transitory computer-readable storage medium of claim 14, wherein the request to modify the one or more regions of the memory device comprises an instruction to add a region to the one or more regions.

19. The non-transitory computer-readable storage medium of claim 14, wherein the request to modify the one or more regions of the memory device comprises an instruction to at least one of update or remove a region of the one or more regions.

20. The non-transitory computer-readable storage medium of claim 14, wherein to modify the copy of each mapping structure according to the request to modify the one or more regions of the memory device, the processing device is to perform operations further comprising:

identifying an instruction to modify the copy of each mapping structure, wherein the instruction is specified by the request to modify the one or more regions of the memory device; and updating an entry of the copy of each mapping structure according to the instruction.

* * * * *